July 26, 1966 J. P. BRODERICK ETAL 3,263,055
ARC WELDING APPARATUS
Filed July 1, 1964
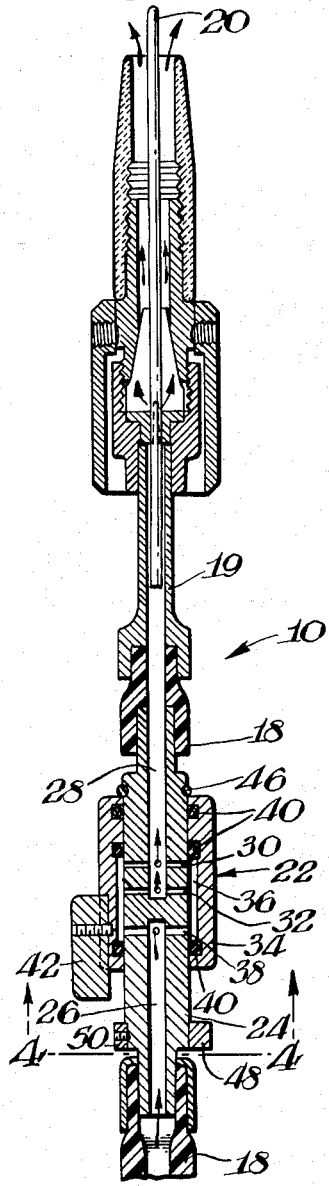
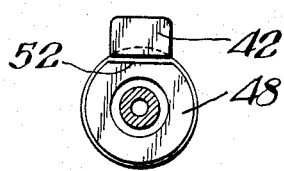
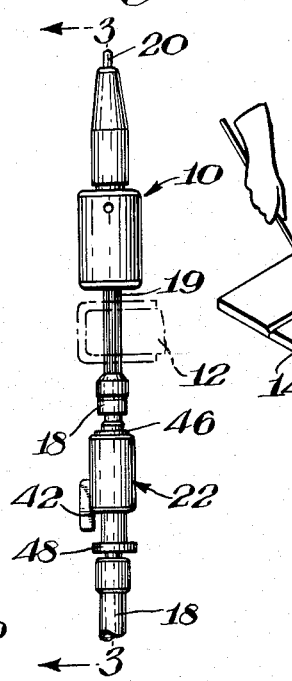
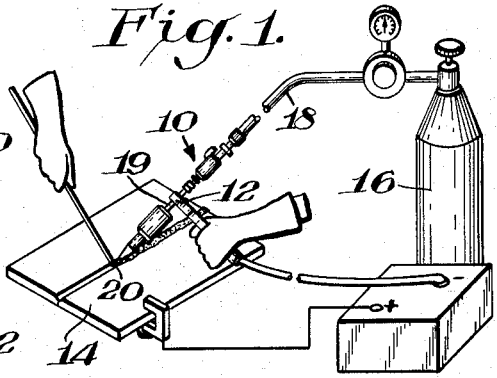
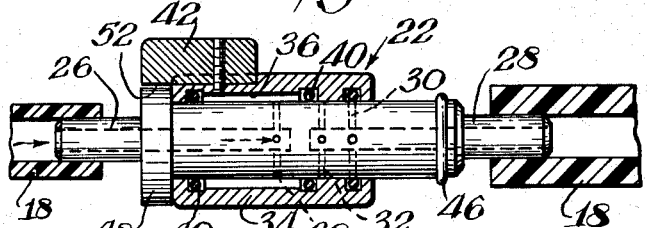
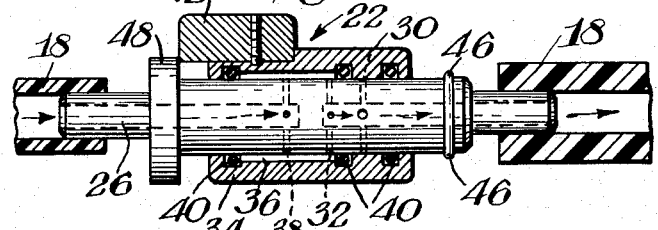
INVENTORS
John P. Broderick
Don L. Keys
Gordon E. Cossaboom
BY Connolly and Hutz
ATTORNEYS

United States Patent Office 3,263,055
Patented July 26, 1966

3,263,055
ARC WELDING APPARATUS
John P. Broderick, Bayside, Don L. Keys, Huntington, and Gordon E. Cossaboom, Syosset, N.Y., assignors to Eutectic Welding Alloys Corporation, Flushing, N.Y., a corporation of New York
Filed July 1, 1964, Ser. No. 379,503
9 Claims. (Cl. 219—75)

This invention relates to a gas shielded arc welding apparatus, and more particularly to such an apparatus which has a control valve for regulating the flow of gas to its non-consumable electrode.

In the tungsten inert gas welding process the arc is maintained between the non-consumable tungsten electrode and electrically grounded work piece. Inert gas, such as argon or helium, is utilized to displace the air surrounding the arc to cool the tungsten electrode. Presently, complex controls are used in the gas control line to control the shielding gas immediately prior to establishing the arc. Upon completion of welding, the gas flow is blocked by closing the control valve. This is usually accomplished by solenoid type valves installed in the power source and actuated by the operator using a foot switch.

A recently developed inert gas welding torch such as shown in U.S. Patent No. 3,116,406 employs flexible plastic tubing to conduct the shielding gas to the arc. This torch differs from conventional torches in that it is designed to be gripped in the jaws of a stick electrode holder. This gripping feature permits the use of standard arc welding equipment in the inert gas process at a minimum expense. The desirability of using this torch however is lessened when it is necessary to resort to conventional complex flow controls as described above.

An object of this invention is to provide the above type torch with a simple and economical control valve for regulating the flow of inert gas to the electrode.

A further object is to provide such a valve which permits restricted flow for providing the electrode with a protective atmosphere between successive welding operations.

In accordance with this invention the welding torch has a three-way valve in its inert gas line to completely stop the flow of gas, to permit full capacity flow, and to allow restricted flow at a sufficient enough rate to provide the electrode with a protective shielding atmosphere as it cools between operations. Additionally, this restricted flow continuously purges the inert gas line of contaminating atmospheric air which might otherwise enter the line. The valve is in the form of a rod having a longitudinal aperture or chamber at each end and a number of radial passageways and radial restricted flow passages communicating with one of the apertures or chambers. A slidable sleeve is telescoped over the rod and has an annular passage communicating with the other aperture or chamber. As the sleeve is moved to each of its three positions, its annular passageway communicates with both the radial passageways and the restricted flow passages to allow full flow; communicates only with the restricted flow passages to permit a reduced rate of flow through the inert gas line; and is out of communication with both the radial passageway and the restricted flow passages to completely stop the flow of gas. The restricted flow passages may be of smaller cross-sectional area than the radial passages to assure that only a dribble of flow results when the radial passageways are closed and the restricted flow passages are open.

In an advantageous form of this invention a stop member extends from one portion of the rod to limit the movement of the sleeve in its closed and in its intermediate positions. When shifting from fully open to restricted flow positions the sleeve is moved until a projection on one of its faces contacts the stop member to hold the sleeve in the intermediate position. To then shift to the fully closed position the sleeve is rotated to move its projection away from the stop member and the sleeve is slid until its face contacts the stop member to hold the sleeve in its closed position. The rod may also have another projection for contacting the other end of the sleeve to limit its movement in the fully open position.

Novel features and advantages of the present invention will become apparent to one skilled in the art from a reading of the following description in conjunction with the accompanying drawings wherein similar reference characters refer to similar parts and in which:

FIG. 1 is a perspective view of one embodiment of this invention;
FIG. 2 is a top plan view of the torch shown in FIG. 1;
FIG. 3 is a cross-sectional view taken through FIG. 2 along the line 3—3;
FIG. 4 is a cross-sectional view taken through FIG. 3 along the line 4—4; and
FIGS. 5 and 6 are fragmental cross-sectional views showing the valve mechanism of FIG. 3 in different phases of operation.

As shown in FIG. 1, torch 10 of the type described in U.S. Patent No. 3,116,406 is conveniently gripped in the jaws of a stick electric holder 12 by the operator for performing a welding operation on work piece 14. A supply 16 of inert gas such as argon or helium feeds the gas through line or conduit 18 to provide the tungsten electrode 20 with a shielding gas atmosphere.

As most clearly shown in FIG. 3, torch 10 includes a flow control valve 22 in the gas line 18 to regulate the flow of gas around electrode 20. Flow control valve 22 includes a rod 24 having a pair of central longitudinal apertures 26 and 28 at each end. The downstream portion of rod 24 also has a series of radial passageways 30 and another series of restricted flow passages 32 which communicate with downstream aperture 28. A slidable sleeve 34 is telescoped over rod 24 and includes an annular passage 36 on its inner surface. This annular passage is maintained in communication with upstream aperture 26 by means of passage 38. O-rings 40 in the inner face of sleeve 34 permit the sleeve to slide over rod 24 while maintaining annular passage 36 sealed from the atmosphere.

Sleeve 34 also includes a handle or projection 42 which extends from upstream face 44 of sleeve 34. Rod 24 carries a front flange 46 which, as shown in FIG. 3, is in the form of a snap ring positioned in a groove in rod 24, while a stop member 48 is immovably secured by pin 50 to the upstream portion of rod 24. As shown in FIG. 4 stop member 48 is of non-circular shape being for example a substantially circular plate or disc with flatttened portion 52 extending a shorter distance from rod 24 than the remaining or arcuate portion of stop member 48.

The operation of control valve 22 is as follows. Valve 22 is normally in the closed position shown in FIG. 5 with annular passage 36 of sleeve 34 out of communication with both radial passageways 30 and restricted flow passageways 32 so that flow of gas from source 16 is completely stopped in downstream longitudinal aperture 26 of rod 24. Immediately prior to establishing the arc, the welder moves sleeve 34 to the fully opened position shown in FIG. 3. In this position, sleeve 34 is in contact with flange 46. When the welder finishes the particular bead, sleeve 34 is moved away from flange 46. Simultaneously, sleeve 34 is rotated (if necessary) so that projection 42 contacts stop member 48 as shown in FIG. 6. In this position, annular passage 36 of sleeve 34 is in communication with restricted flow passages 32 but does not communicate with radial flow passageways 30, thereby permitting only a dribble or low flow volume of gas through the torch. Advantageously, the cross-sectional area of restricted flow passages 32 is less than the cross-sectional area of radial feed passageways 38 to assure only a low flow volume of gas passing through valve 22. This low flow volume of gas performs the function of insuring that the hot tungsten electrode cools in a protective atmosphere. In addition, the constant dribble or "leak" pressure continually purges the gas line 19 around electrode 20 to prevent contaminating atmospheric air from entering line 19.

When the welder is ready to resume his welding operations, sleeve 34 is moved back to the fully open position shown in FIG. 3. The gas flow is immediately stepped up to that required for welding as previously described. When a given welding operation is completed or when welding ceases for the day, sleeve 34 is moved to the closed position shown in FIG. 5. Simultaneously, as sleeve 34 is moved toward this position it is rotated so that projection 42 is disposed toward flattened position 52 which permits projection 42 to slide over the flattened portion until upstream face 44 contacts stop member 48.

Torch 10 can easily be manipulated and the flow through it accurately controlled without complex valve mechanisms, by merely moving the aforedescribed valve 22 to its various positions to enable the welder to easily adjust the gas flow through the torch to suit his immediate requirement. Additionally, valve 22 is made light in weight and can easily be affixed to the plastic tubing 18. Advantageously plastic tubing 18 which is on both sides of valve 22, effectively insulates valve 22 from current carrying metal tube 19 to protect the welder's hand from the "live" voltage in metal tube 19.

What is claimed is:

1. An arc welding apparatus comprising a torch, an inert gas conduit in said torch, a non-consumable electrode in said conduit at one end of said torch, a supply of inert gas communicating with said conduit, and a three-way valve in said conduit between said electrode and said gas supply for controlling the flow of gas to said electrode, said valve having a closed position for preventing flow of gas to said electrode, said valve having a fully open position for permitting full capacity flow of gas to said electrode, and said valve having an intermediate position for permitting restricted flow of gas to said electrode at a sufficient rate to provide a protective shielding atmosphere for said electrode when it cools between operations, said three-way valve including a rod having a longitudinal aperture at each end thereof communicating with said conduit, a number of radial passageways in said rod communicating with one of said longitudinal apertures, a number of radial restricted flow passages in said rod communicating with said one longitudinal aperture, a slidable sleeve telescoped over said rod, an annular passage in said sleeve communicating with the other of said longitudinal apertures, said annular passage being disposed and arranged to communicate with said radial passageways and said restricted flow passages when said sleeve is moved to said fully open position, said annular passage being disposed and arranged to communicate with said restricted flow passage and to be out of communication with said radial passageways when said sleeve is moved to said intermediate position, and said annular passage being disposed and arranged to be out of communication with said radial passageways and said restricted flow passages when said sleeve is moved to said closed position.

2. An apparatus as set forth in claim 1 wherein the cross-sectional area of said restricted flow passages is less than the cross-sectional area of said radial passageways.

3. An apparatus as set forth in claim 1 wherein said one longitudinal aperture is downstream of said other longitudinal aperture, and said radial passageways being downstream of said restricted flow passages whereby movement of said sleeve in an upstream direction causes said radial passageways to close before said restricted flow passages close.

4. An apparatus as set forth in claim 3 wherein sliding sealing means are on the inner surface of said sleeve.

5. An apparatus as set forth in claim 3 wherein stop means are on said rod and said sleeve for limiting the movement of said sleeve in its various positions.

6. An apparatus as set forth in claim 5 wherein said stop means includes a projection on the upstream face of said sleeve, said sleeve being rotatable, a stop member being on said rod upstream of said sleeve for contacting said sleeve projection when said sleeve is moved to said intermediate position and for contacting said sleeve when said sleeve projection is rotated away from said stop member and said sleeve is moved to its closed position.

7. An apparatus as set forth in claim 6 wherein said stop member is a plate secured around said rod, and said plate being of non-circular cross-section whereby one portion of said plate extends a greater distance from said rod than the remainder of said plate to contact said sleeve projection.

8. An apparatus as set forth in claim 7 wherein said plate is a substantially circular disc with a portion of its surface being flat whereby the arcuate portion of said disc is adapted to contact said sleeve projection.

9. An apparatus as set forth in claim 6 wherein said stop means includes a projection on said rod disposed downstream of said sleeve for abutting against said sleeve when it is moved to said fully open position.

References Cited by the Examiner

UNITED STATES PATENTS 3,061,709  10/1962  Hill _____ 219—75
3,116,406  12/1963  Barnes _____ 219—75

RICHARD M. WOOD, *Primary Examiner.*